US006159383A

United States Patent [19]

Gullett et al.

[11] Patent Number: 6,159,383

[45] Date of Patent: Dec. 12, 2000

[54] FILTER HEAD ASSEMBLY

[75] Inventors: David F. Gullett, Peoria; Larry A. Larson, Chillicothe, both of Ill.

[73] Assignee: Caterpillar Inc., Peoria, Ill.

[21] Appl. No.: 09/062,336

[22] Filed: Apr. 17, 1998

[51] Int. Cl.[7] .......... B01D 35/26

[52] U.S. Cl. .......... 210/741; 123/509; 123/514; 210/299; 210/416.4; 210/90; 417/53; 417/313; 417/360

[58] Field of Search .......... 210/90, 97, 120, 210/132, 133, 171, 295, 299, 416.4, 416.5, 440, 443, 444, 741, 767, 188, 433.1, 249; 417/53, 313, 360; 123/196 A, 509, 514, 516

[56] References Cited

U.S. PATENT DOCUMENTS

| | | | |
|---|---|---|---|
| 1,982,376 | 11/1934 | DeLancy | 210/416.5 |
| 4,491,120 | 1/1985 | Hodgkins | 123/557 |
| 4,502,954 | 3/1985 | Druffel | 210/136 |
| 4,569,637 | 2/1986 | Tuckey | 417/360 |
| 5,231,967 | 8/1993 | Baltz et al. | 123/497 |
| 5,362,392 | 11/1994 | Jensen | 210/249 |
| 5,501,791 | 3/1996 | Theisen et al. | 210/90 |
| 5,643,446 | 7/1997 | Clausen et al. | 210/184 |
| 5,860,796 | 1/1999 | Clausen | 210/416.4 |
| 5,915,926 | 6/1999 | Janik et al. | 417/53 |
| 5,958,237 | 9/1999 | Cort et al. | 210/416.4 |

*Primary Examiner*—Joseph W. Drodge
*Attorney, Agent, or Firm*—Keith P. Roberson

[57] ABSTRACT

A filter head having a pump housing, a flow passage network, and a mounting bracket is adaptable to engage a replaceable filter cartridge. An electric pump is positioned within the pump housing. A Seal/isolator disposed between the pump housing and electric pump protects the electric pump from vibrations. After changing the filter cartridge, typically an air pocket forms creating a danger for a fuel injector or fuel injector pump. By using an electronic controller, an operator may remotely operate the electric pump to prime the filter cartridge. Also, the electronic controller may selectively determine whether the fluid flowing from the filter cartridge passes through the electric pump or instead passes directly into an outlet.

5 Claims, 8 Drawing Sheets

FILTER HEAD ASSEMBLY

TECHNICAL FIELD

This invention relates to a filter head assembly for an internal combustion engine. Specifically, the invention relates to a filter head having a mounting bracket and an integral pump adapted for priming a fuel supply line and removing air pockets in the fuel supply line.

BACKGROUND ART

When changing a fuel filter, an air pocket is often created. The air pocket may cause difficulty for an associated fuel pump drawing fuel through a fuel line from a fuel supply reservoir. Similarly, using a sump fuel pump submerged in the fuel supply reservoir might push the air pocket through the fuel line to associated fuel injectors which are not designed to function with air pockets in the fuel. Moreover, operating fuel injectors with such air pockets may damage the fuel injectors.

The earliest solution to this problem was an attempt to reduce the volume of the air pockets by as much as possible. A person performing the filter change poured clean fuel into the new fuel filter. This operation reduced the volume of the air pockets, but it could not completely eliminate the air pockets.

A similar method of removing the void is by filling the filter with fuel after installation. This usually is accomplished by manually actuating a control valve to select either a normal flow path or a priming fuel path. In the priming fuel path, fuel is siphoned through an inlet into a filter head. In the filter head a hand pump pushes fuel into the fuel filter. See U.S. Pat. No. 5,362,392 issued to Jensen Nov. 8, 1994. After filling the fuel filter, the control valve is used to select the normal flow path which bypasses the hand pump. Other similar methods employ check valves instead of manually actuating the control valve.

Manual pumps and manually actuated control valves, however, create inconveniences for both designers and operators. For example, operators may inadvertently fail to reposition the control valve to allow for fuel to flow in the normal path. Typically the designer must pay close attention to ergonomic considerations of both filter removal and pump actuation. Specifically, designers that utilize manual pumps must consider whether an operator is able to reach the manual pump and filter without getting too close to hot or dirty engine parts or work in the cramped confines of the vehicle structure.

Other related art shows an electric charge pump atop a fuel filter. See U.S. Pat. No. 5,231,967 issued to Baltz et al. Aug. 3, 1993. This integrated pump and filter is adapted for continuous use as a main fuel pump as opposed to a priming pump. Moreover, the Baltz et. al. pump/filter combination operates any time the ignition switch is on and is not selectively operable. This electric pump is exposed to vibrations associated with the vehicle operation. The present invention is directed at overcoming one or more of the problems set forth above.

DISCLOSURE OF INVENTION

According to an aspect of the present invention, a filter head device for mounting a replaceable filter cartridge includes a fuel inlet, a pump housing, a fuel outlet, and an electric pump. The filter cartridge has an inlet and an outlet. The fuel inlet is connectable to the inlet of the filter cartridge. The outlet of the filter cartridge is connectable to the pump housing. The pump housing has a cavity. The fuel outlet is also connectable to the pump housing. The pump is located in the cavity of the pump housing. The pump has a pump inlet and pump outlet. The pump inlet is connectable to the outlet of the cartridge, and the pump outlet is connectable to the fuel outlet.

Various other features of the invention will become apparent to those of ordinary skill in the art upon review of the following detailed description of the best mode for carrying out the invention, appended drawings, and upon review of the following claims.

BEST MODE FOR CARRYING OUT THE INVENTION

The following description is of the best mode presently contemplated for carrying out the invention. This description is not to be taken in a limiting sense but is made merely for the purpose of describing the general principals of the invention. The scope and breadth of the invention should be determined with reference to the claims.

Figure 1:
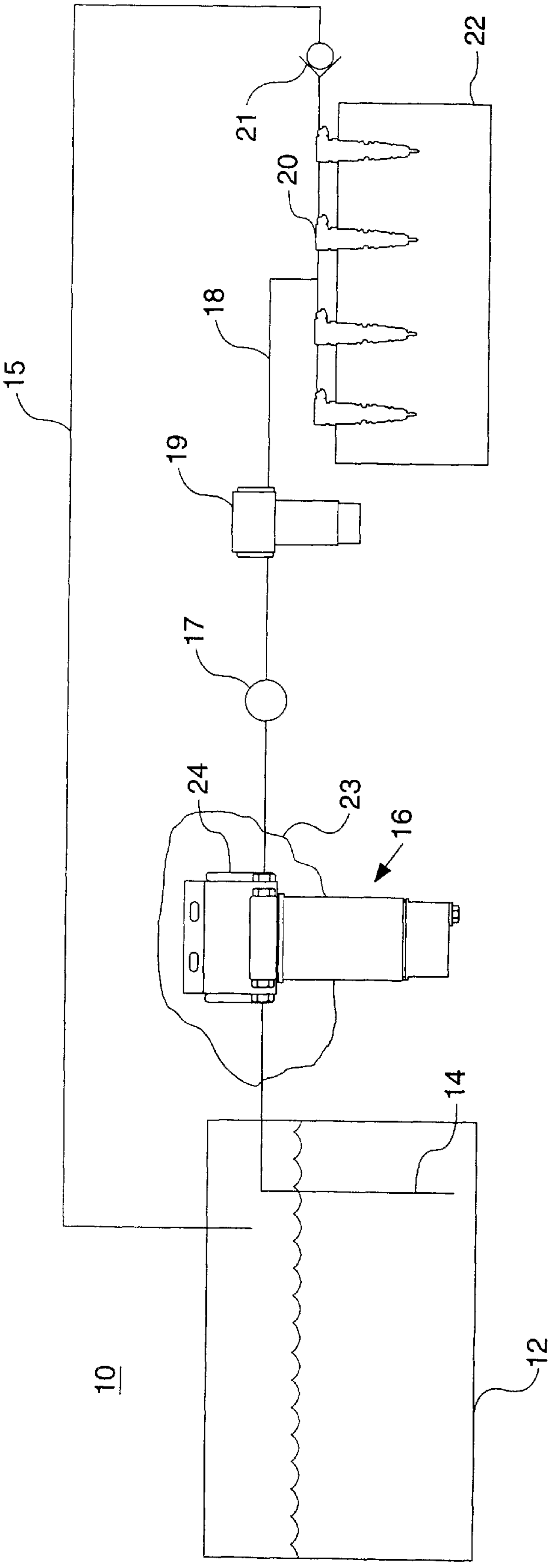
FIG. 1 is a schematic of a fuel system.

FIG. 1 shows a fuel system 10 having a fuel reservoir 12, a fuel supply line 14, a fuel return line 15, a filter head assembly 16, a fuel injector line 18, fuel injectors 20, and an engine 22. Optionally the fuel system might include a transfer pump 17 and final fuel filter 19 disposed downstream of the filter head assembly. The fuel supply line 14 connects the fuel reservoir 12 to the filter head assembly 16. The filter head assembly 16 is connected to a vehicle frame 23, but the filter head assembly 16 might be attached to any structure including the engine 22. Fuel injector lines 18 connect the filter head assembly 16 to the fuel injectors 20 which are connected to the engine 22. However, the filter head assembly 16 might also direct fuel into the optional transfer pump 17. After exiting the transfer pump 17, a final filter 19 removes any impurities that might be present from the transfer pump 17. After exiting the final filter 19 fuel enters the fuel injectors. The fuel injectors 20 connect with the fuel reservoir 12 through the fuel return line 15. A check valve 21 is positioned in the fuel return line 15 intermediate the fuel injectors 20 and the fuel reservoir 12.

Figure 2:
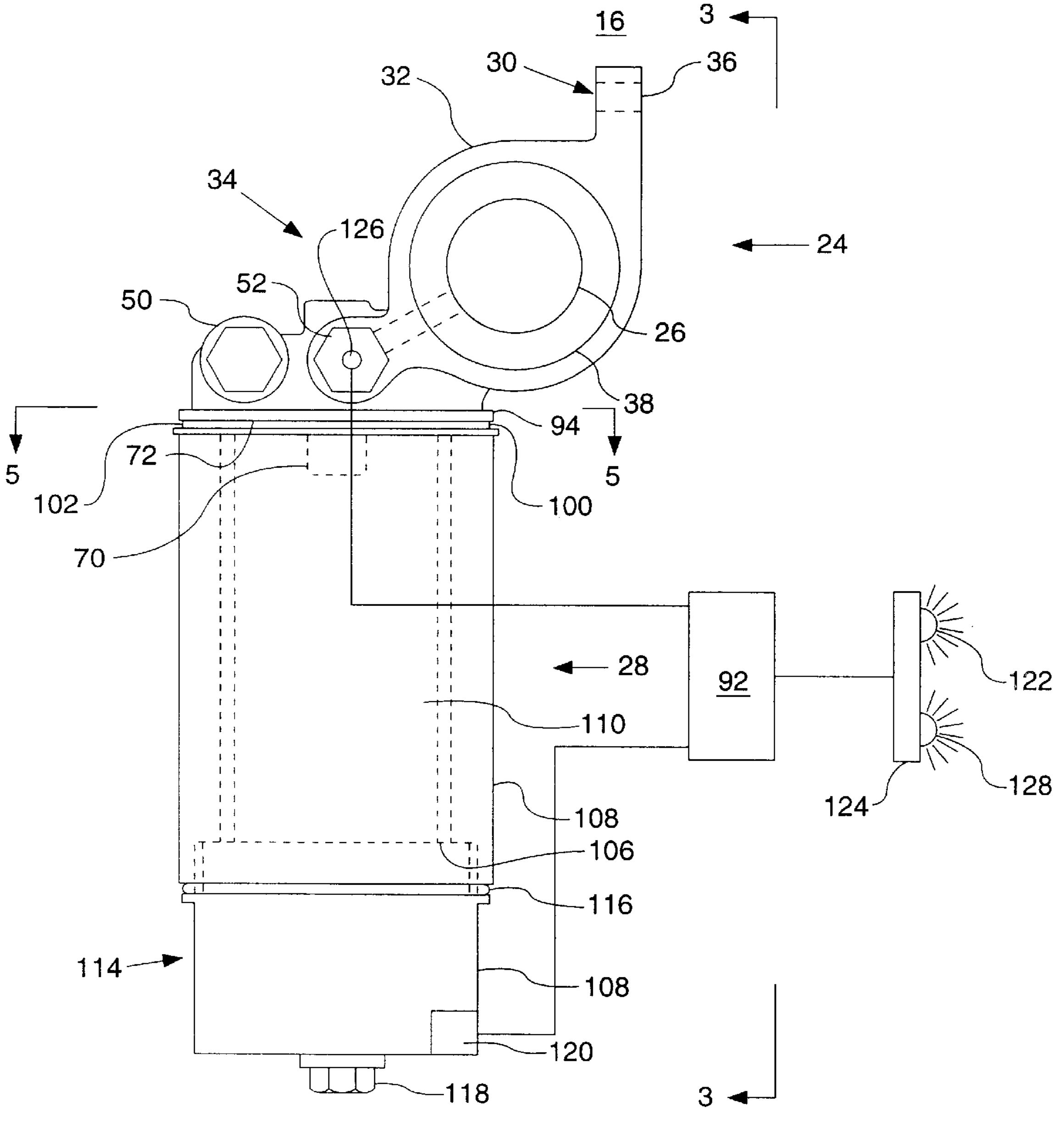
FIG. 2 is a side view of a filter head assembly.

The schematic in FIG. 2 shows the filter head assembly 16 having a filter head 24, an electric pump 26, and a filter cartridge 28. The filter head 24 is formed by a mounting bracket 30 integral with a pump housing 32 and a flow passage network 34. The mounting bracket 30 preferably has two mounting holes 36 for attaching the filter head 24 to the vehicle frame 23 shown in FIG. 1 or any other structure such as the engine. Alternatively, the mounting bracket 30 might also be connected to the vehicle frame 24 using bolts, clamps, bands, adhesives, or similar attachment means. The pump housing 32 has a generally cylindrical housing bore 38. While the preferred embodiment shows the housing bore 38 as cylindrical, other spaces, cavities, or openings able to contain the electric pump 26 are suitable.

Figure 3:
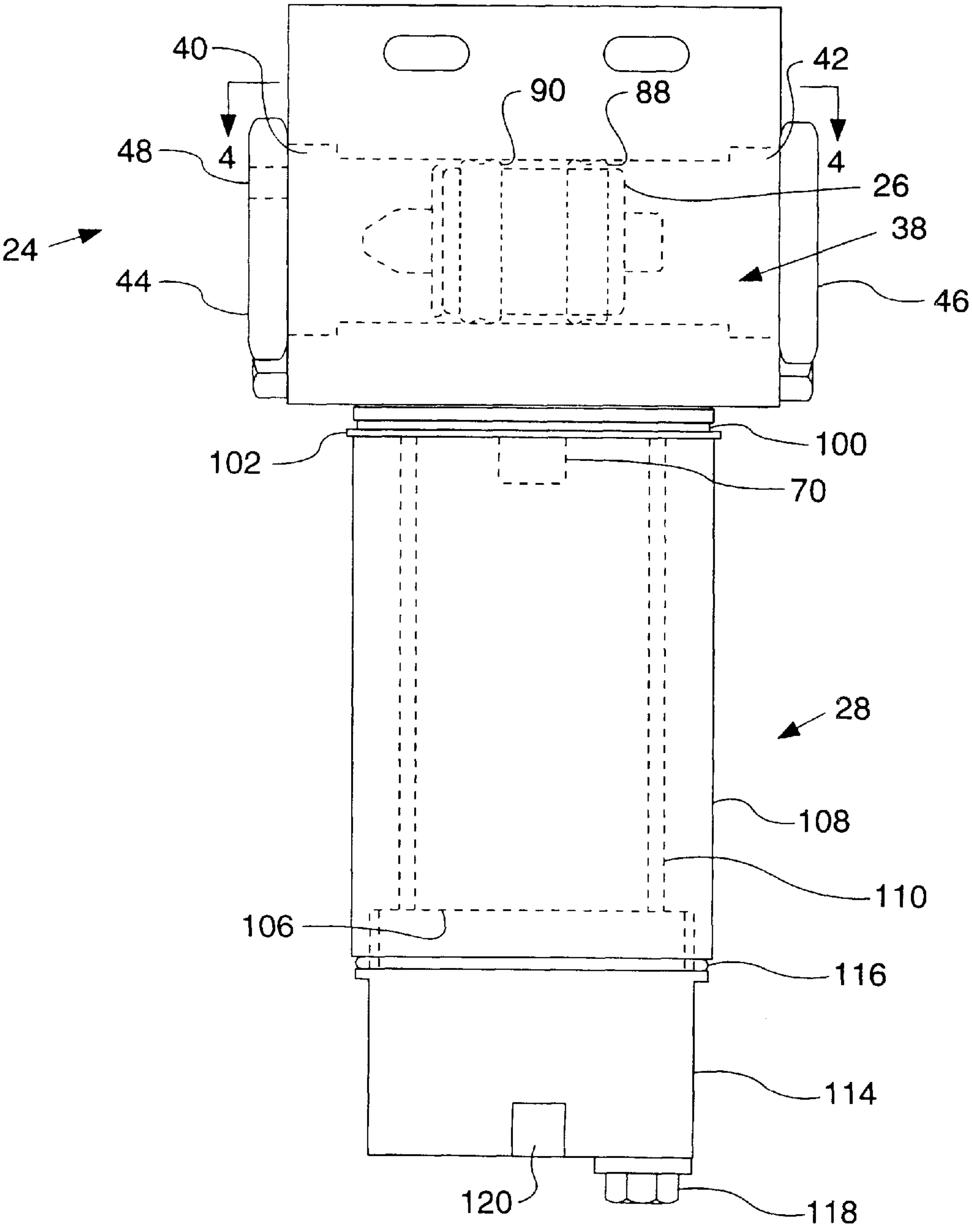
FIG. 3 is a back view of the filter head assembly.

FIG. 3 shows the pump housing 32 having a first end 40 and a second end 42. A first bore cap 44 covers the housing bore 38 on the pump housing first end 40. A second bore cap

46 covers the housing bore 38 on the pump housing second end 42. The first bore cap 44 also includes an electrical wiring conduit 48.

Figure 4:
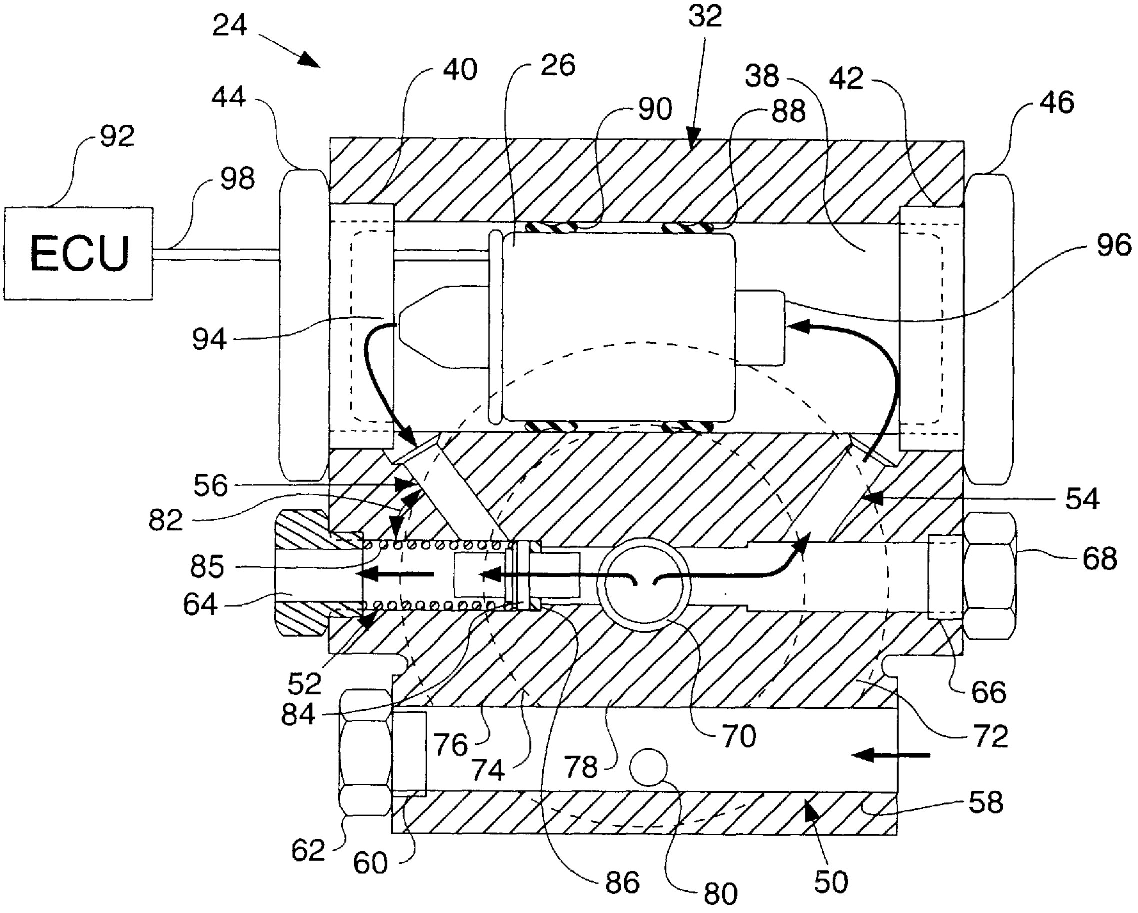
FIG. 4 is a top view of a filter head.

As shown in FIGS. 2 and 4, the flow passage network 34 includes a fuel inlet 50, a fuel outlet 52, a housing inlet passage 54, and a housing exit passage 56. The fuel inlet 50 has a first end 58 and a second end 60. The fuel inlet first end 58 is connected to the fuel supply line 14. The fuel inlet second end 60 is sealed with a first line cap or plug 62. The flow passage network 34 also includes the fuel outlet 52, shown as generally parallel to the fuel inlet 50. As with the fuel inlet 50, the fuel outlet 52 has a first end 64 and a second end 66. While the illustrated embodiment shows the fuel inlet 50 and the fuel outlet 52 in a parallel configuration, other flow configurations might provide more convenient packaging. For example, the fuel inlet 50 and fuel outlet 52 may be arranged as being perpendicular to one another or at any other predetermined angle with respect to one another. The fuel outlet first end 64 is connected to the fuel injector supply lines 18 while the fuel outlet second end 66 is sealed with a second line cap or plug 68.

FIG. 3 and FIG. 4 shows a threaded nipple or spud 70 connected to the fuel outlet 52 between the first end 58 and second end 60 of the fuel outlet 52. The-filter head 24 also includes a sealing surface 72 against which the filter cartridge 28 seats. FIG. 4 shows the sealing surface 72 of the filter head 24 as a ring-shaped surface which has an inner diameter edge 74 abutting the spud 70 and an outer diameter edge 76 generally dimensioned to have a larger diameter than that of the filter cartridge 28. The sealing surface 72 has an annular channel 78 between the outer diameter edge 76 and the and the inner diameter edge 74 and concentric with the spud 70. A filter inlet port 80 connects the fuel inlet 50 to the annular channel 78 within the sealing surface 72.

FIG. 4 further illustrates the housing inlet passage 54 connecting the fuel outlet second end 56 to the housing bore 38 near the pump housing second end 42. A housing exit passage 56 connects the pump housing first end 40 to the fuel outlet first end 64. As shown, the housing exit passage 56 intersects the fuel outlet first end 64 at a prescribed angle 82 greater than zero degrees but less than ninety degrees. The preferred embodiment employs a mechanical check valve 84 slidably positioned in the fuel outlet first end 64. The mechanical check valve 84 is responsive to the pressure differential between the fuel outlet first end 64 and fuel outlet second end 66. To prevent flow from bypassing the electric pump 26, a spring holds 85 the mechanical check valve 84 held on a valve seat 86 located near the fuel outlet first end 64 between the housing exit passage 56 and the spud 70. An electronic valve, a hydraulic valve, a pneumatic valve, or other similar valve might also be used to perform the flow checking function.

The electric pump 26 is located in the housing bore 38 with a first seal/isolator 88 disposed between the electric pump 26 and the pump housing 32 downstream of the housing inlet passage 54. A second seal/isolator 90 is disposed between the electric pump 26 and the pump housing 32 upstream of the housing exit passage 56 and downstream of the first seal/isolator 88. Several types of electric pumps may be utilized including: priming, charging, or boost type any of which may be controlled using an electronic controller 92. The electric pump 26 has a pump outlet 94 disposed proximate the pump housing first end 40 and a pump inlet 96 disposed proximate the pump housing second end 42. The electric pump 26 also has two electrical leads 98 connected to the electronic controller 92 through the electrical wiring conduit 48.

Figure 5:
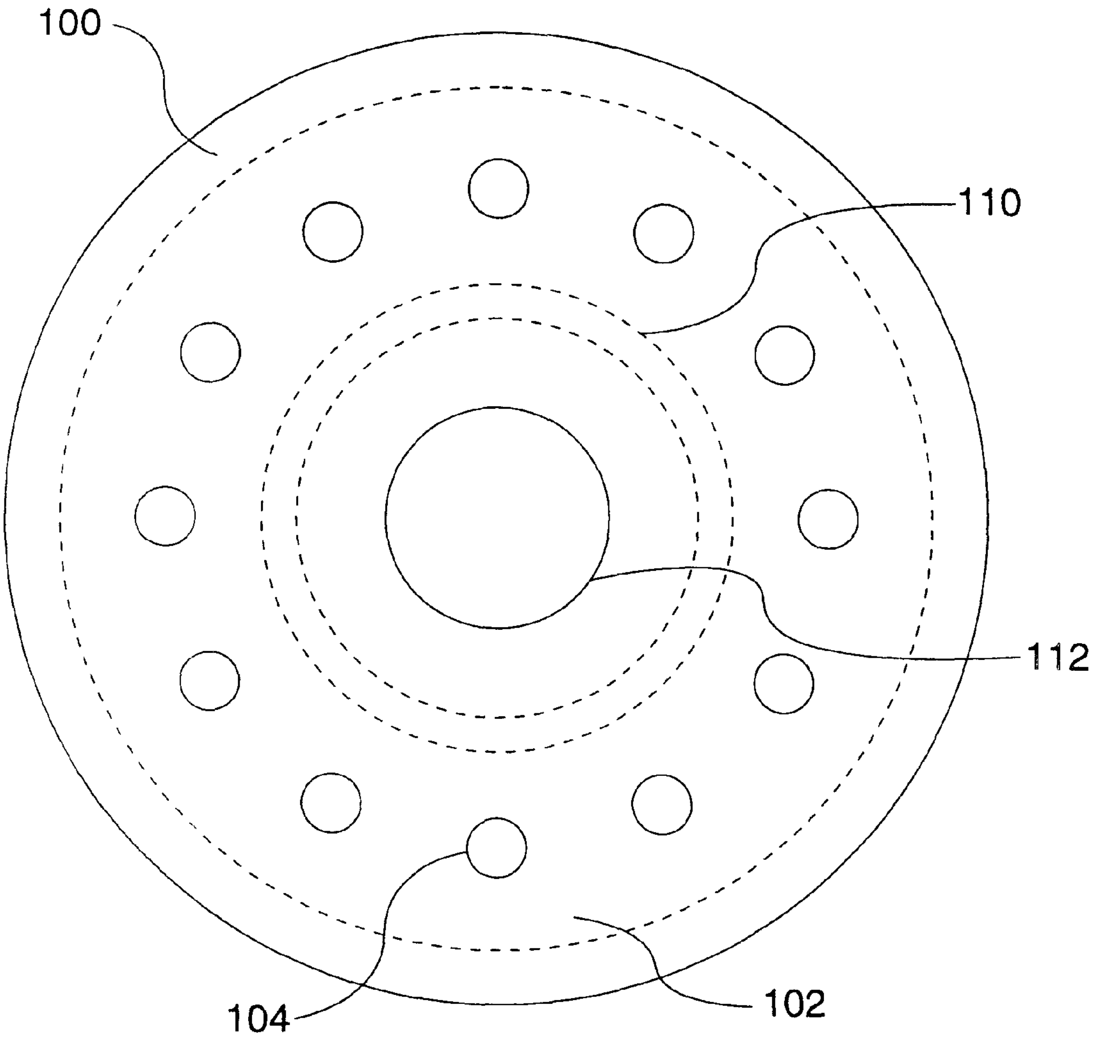
FIG. 5 is a top view of a filter cartridge.

Referring now to FIG. 2 and FIG. 5, the filter cartridge 28 is threadably attached to the spud 70 in a "spin on" type fashion. A circular sealing resilient gasket 100 is displaced between the sealing surface 72 of the filter head 24 and a top plate 102 of the filter cartridge 28. The top plate 102 has a number of openings 104 adapted to allow fuel to pass through the filter cartridge 28 from the annular channel 78 on the sealing surface 72 of the filter head 24. The illustrated fuel cartridge 28 also includes an end plate 106 that is attached to a filter wall 108 of the filter cartridge 28 opposite the top plate 102. A generally cylindrical filter element 110 is disposed within the filter cartridge 28 parallel to the filter wall 108 and moving from the openings 104 to a filter outlet 112 located on the top plate 102. The filter outlet 112 is threadably attached to the spud 70.

In FIG. 2, the filter cartridge 28 includes a water separating bowl 114 threadably attached to the end plate 106. The water separating bowl 114 is adapted for collecting water separated from the fuel. An O-ring type seal 116 is disposed between the water separating bowl 114 and the end plate 106. The water separating bowl 114 includes a drain valve 118 threaded into the water separating bowl 114. A water level sensor 120 may be located in or near the water separating bowl 114 and sends an input signal to the electronic controller 92 which may activate a water drain warning indicator or light 122 on the control panel 124. In another embodiment, the filter head 24 has a pressure sensor 126 located in or near the fuel outlet first end 64. The pressure sensor 126 sends an input signal to the electronic controller 92 which may activate a blockage warning indicator 128 on the control panel 124.

Figure 6A:
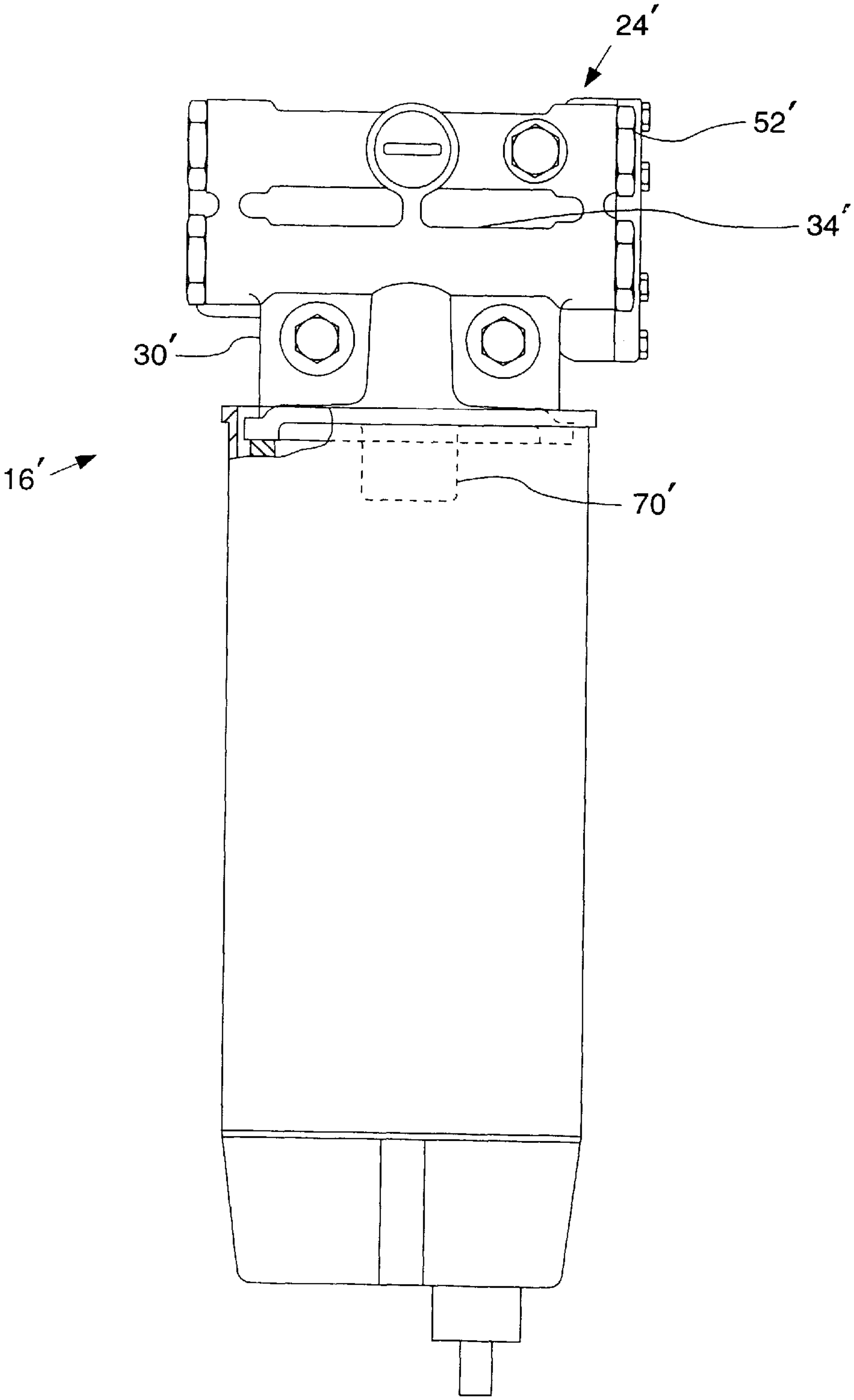
FIG. 6*a* is a frontal view of a second embodiment of the filter head assembly
Figure 6B:
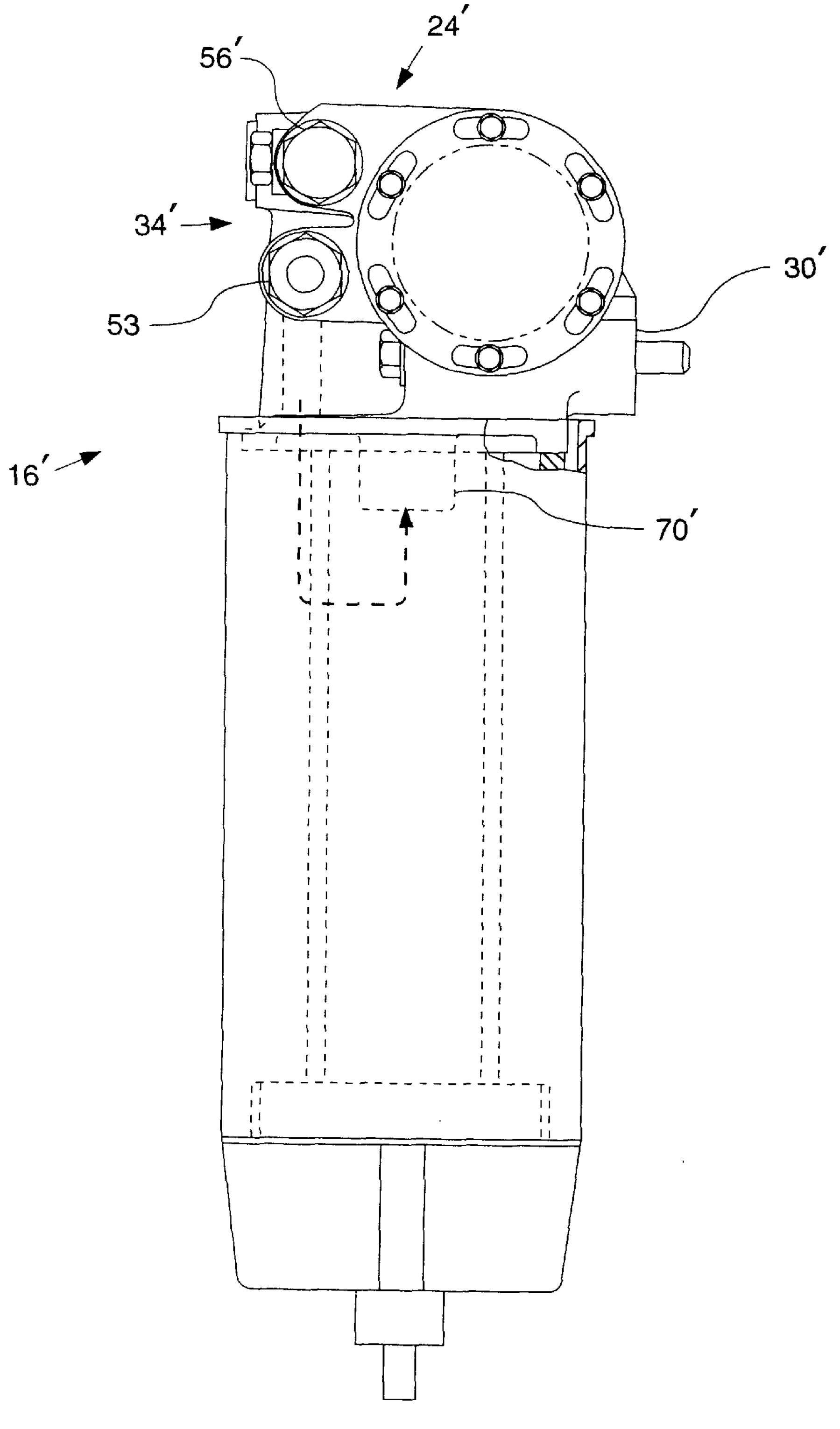
FIG. 6*b* is a side view of the second embodiment of the filter head assembly.
Figure 7:
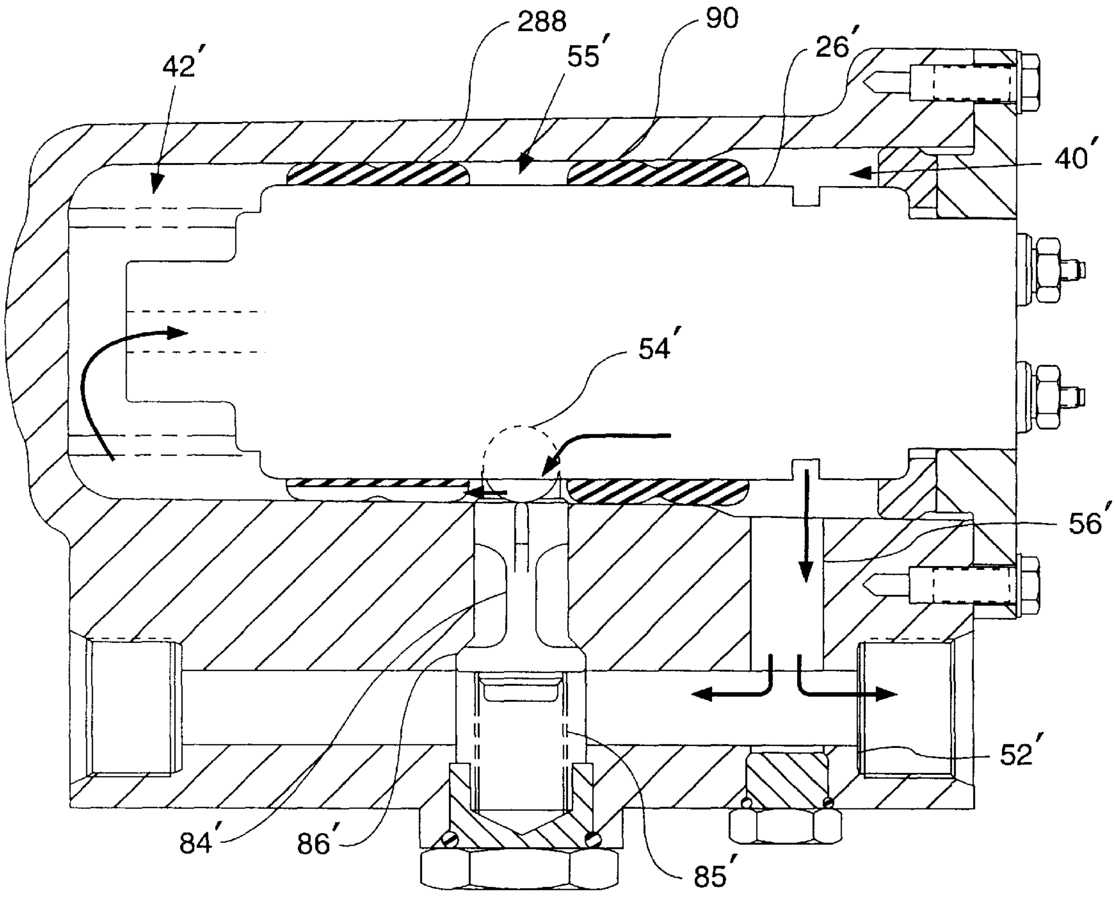
FIG. 7 is a top view of the second embodiment of the filter head.

In another embodiment of the filter head 24', FIG. 6*a,* FIG. 6*b,* and FIG. 7 show a modified flow passage network 34' having a housing inlet passage 54', a housing exit passage 56', and a bypass passage 57'. This filter head 24' operates in essentially the same manner as above. However, the spud 70' connects directly to the housing inlet passage 54' instead of connecting to the fuel outlet 52'. The housing inlet passage 54' empties fuel into an annular volume 55' defined by a grooved isolator 288 and a seal/isolator 90' longitudinally and the electric pump 26' and the pump housing 32' radially. The grooved isolator 288 allows fuel to pass from housing inlet passage 54' into the pump housing second end 42'. The bypass passage 57' also connects to the annular volume 55'. A mechanical check valve 84' prevents flow from bypassing the electric pump 26' when it is operating. A spring 851 presses the mechanical check valve 84' against a valve seat 86'. The housing exit passage 56' is located in the pump housing first end 40' downstream from the seal/isolator 90'. Both the housing exit passage 56' and the bypass passage 57' are connected to the fuel outlet 52'. FIG. 6 shows a mounting bracket 30' located near the center of gravity of the filter head assembly 16'.

Industrial Applicability

In typical operation, the operator knows the air pocket may be present after a fuel filter change. However, other occurrences of an air pocket are less predictable. Operators may run out of fuel which would cause the air pocket, or failure to operate the engine over time might lead to formation of air pockets. Using the filter head assembly 16, the operator avoids the manual priming that might otherwise be required when air pockets form. In the preferred embodiment, the electronic controller 92 or the operator may cause an output signal to be sent to the electric pump 26 via the electrical leads 98. Initiating the electric pump 26 creates a vacuum upstream of the electric pump 26. Also, the electronic controller 92 can be programmed to initiate the electric pump 26 on a regular or periodic basis. Once initiated, the electric pump 26 pulls fuel from the fuel reservoir 12 to the fuel inlet 50. Fuel in the fuel inlet 50 passes through the filter inlet port 80 into the annular channel 78. The circular sealing resilient gasket 100 prevents ambient air from entering into the filter head assembly 16 and prevents fuel from exiting the filter head assembly 16 at the connection between the filter cartridge 28 and filter head 24.

Fuel from the annular channel 78 enters the filter cartridge 28 through the openings 104 in the top plate 102. The fuel then passes through the filter element 110 of the filter cartridge 28 to the filter outlet 112 connected to the spud 70. Fuel may be handled various ways within the filter cartridge 28.

Due to gravity, any water within the fuel settles towards the end plate 106 and most of this water enters the water separating bowl 114. The water level sensor 120 in the water separating bowl 114 alerts the operator of a need to drain the water by sending an input signal to the electronic controller 92. In the present embodiment, the electronic controller 92 activates the water drain warning indicator or light 122 on the control panel 124. Also, making the water separating bowl 114 of a translucent material allows a visual check of the water level. The drain valve 118 provides a convenient method for removing the water accumulated in the water separating bowl.

Having passed through the filter cartridge 28, the electric pump 26 draws fuel through the spud 70 into the fuel outlet 52. Prior to entering the electric pump 26, fuel passes from the fuel outlet second end 66 through the housing inlet passage 54 into the pump housing second end 42 near the pump inlet 96. Fuel exits the pump outlet 94 into the housing bore 38 near the pump housing first end 40. As pressure in the pump housing first end 40 increases, fuel passes into the fuel outlet first end 64 via the housing exit passage 56.

To prevent fuel in the housing bore 38 near the pump inlet 96 from passing into the housing bore 38 near the pump outlet 94, a first seal/isolator 88 and second seal/isolator 90 are compressed between the pump housing 32 and the electric pump 26 to form flow barriers. By using a resilient material, these seal/isolators 88 and 90 also protect the electric pump 26 from damage due to intense engine vibration or vehicle impact. The first bore cap 44 prevents fuel from leaking out of the pump housing 32. The second bore cap 46 prevents ambient air from entering into the pump housing 32 or fuel from leaking out of the pump housing.

Fuel in the housing exit passage 56 is directed to impact the mechanical check valve 84. When the electric pump 26 is operating, fuel from the housing exit passage 56 is at a higher pressure than fuel exiting the spud 70 on the opposite side of the mechanical check valve 84. The difference in pressures coupled with the fuel impact on the mechanical check valve 84 pushes the mechanical check valve 84 against the valve seat 86 and prevents flow from bypassing the electric pump 26 while it is operating.

When the electric pump 26 is not operating, the housing inlet passage 54 is blocked by the electric pump 26 and allows very little flow to pass into the housing exit passage 56. Flow from the spud 70 pushes the mechanical check valve 84 away from the valve seat 86 to allow flow to bypass the pump housing 32. Instead, flow moves directly into the fuel outlet first end 64.

The second embodiment in FIGS. 6*a,* 6*b* and 7, operates in a similar manner to the first embodiment. The main difference being the way in which fuel bypasses the electric pump 26'. In the second embodiment flow from the filter outlet 112' always enters directly in the pump housing via the housing inlet passage 54'. The mechanical check valve 84' is generally held against the valve seat 86' by a spring when the electric pump 26' is operating. The pressurized fuel downstream of the electric pump 26' acts on one side of the mechanical check valve 84' along with the spring 85' to press the mechanical check valve against 84' the valve seat 86'. While the electric pump 26' is not operating, pressure in the pump housing second end 46' rises until it overcomes the force being applied by the spring 85'.

Other aspects, objects, and advantages of this invention can be obtained from study of the drawings, the disclosure, and the appended claims.

What is claimed is:

1. A fuel filtering system for an internal combustion engine, said internal combustion having a fuel supply line and a fuel reservoir, said fuel filtering system comprising:

a filter head, said filter head having a pump positioned in a housing, said pump having a pump inlet and a pump outlet, said housing being adapted to protect said pump from impact and vibration, said housing having a housing inlet and a housing outlet, said housing inlet being in flow communication with said pump inlet, said housing outlet being in flow communication with said pump outlet, said housing inlet being connectable with said fuel reservoir, said housing outlet being connectable with said fuel supply line;

a replaceable filter element being connectable with said housing, said replaceable filter element being adapted to separate water and a plurality of impurities from a fuel;

a water separating bowl being in flow communication with said replaceable filter element, said water separating bowl being adapted to collect water separated from said fuel; and a pressure sensor positioned in said housing, said pressure sensor providing an output signal, said pump operating in response to said output signal from said pressure sensor.

2. A method of preventing an air pocket from forming in a fuel system comprising the steps of:

sensing a pressure in a filter head indicative of said air pocket; and operating a pump integrated into said filter head in response to said sensed pressure so as to remove said air pocket, said filter head having a fuel inlet, a fuel outlet, a filter inlet port, and a spud, said fuel inlet being connectable with a fuel reservoir, said fuel outlet being connectable with a fuel injector line, said fuel filter inlet port being adapted to transfer fuel from said filter head to a filter element, said spud being adapted to receive fuel from said filter element, said fuel inlet being connectable with said fuel filter inlet port, said spud being connectable with said fuel outlet.

3. A method of purging an air pocket from a fuel system comprising the step of:

sensing a pressure in a filter head within the fuel system indicative of said air pocket; and operating a pump in response to said sensed pressure so as to remove said air pocket.

4. The method as specified in claim 3 wherein said pump is integrated within said filter head.

5. The method as specified in claim 3 wherein said operating step further comprising the steps:

receiving an input signal indicative of said pressure at a controller; and sending an output signal from said controller to said pump.

* * * * *